United States Patent
Niiyama

(10) Patent No.: US 12,461,335 B2
(45) Date of Patent: Nov. 4, 2025

(54) FIXTURE OF HALF MIRROR

(71) Applicant: AGC Inc., Tokyo (JP)

(72) Inventor: Satoshi Niiyama, Tokyo (JP)

(73) Assignee: AGC Inc., Tokyo (JP)

(*) Notice: Subject to any disclaimer, the term of this patent is extended or adjusted under 35 U.S.C. 154(b) by 499 days.

(21) Appl. No.: 18/050,247

(22) Filed: Oct. 27, 2022

(65) Prior Publication Data

US 2023/0075503 A1    Mar. 9, 2023

Related U.S. Application Data

(63) Continuation of application No. PCT/JP2021/015434, filed on Apr. 14, 2021.

(30) Foreign Application Priority Data

Apr. 28, 2020 (JP) .................................. 2020-079375

(51) Int. Cl.
*G02B 7/182*    (2021.01)
*A47G 1/02*    (2006.01)
*G02B 27/28*    (2006.01)

(52) U.S. Cl.
CPC ............... *G02B 7/182* (2013.01); *A47G 1/02* (2013.01); *G02B 27/283* (2013.01)

(58) Field of Classification Search
CPC ......... G02B 7/182; G02B 27/283; A47G 1/02
USPC ........................................ 359/839, 871, 872
See application file for complete search history.

(56) References Cited

U.S. PATENT DOCUMENTS

| | | | | |
|---|---|---|---|---|
| 5,956,181 A | * | 9/1999 | Lin | ........................ B60R 1/12 |
| | | | | 359/630 |
| 7,884,814 B1 | * | 2/2011 | Graham | ................ G06F 1/1609 |
| | | | | 345/905 |
| 2004/0027695 A1 | * | 2/2004 | Lin | ........................ B60R 1/083 |
| | | | | 359/839 |
| 2006/0150462 A1 | * | 7/2006 | Rossi | ...................... A47G 1/02 |
| | | | | 348/E5.128 |
| 2014/0347488 A1 | * | 11/2014 | Tazaki | ..................... B60R 1/04 |
| | | | | 348/148 |
| 2016/0238853 A1 | * | 8/2016 | Kimura | ............ G02F 1/133308 |

(Continued)

FOREIGN PATENT DOCUMENTS

CN    103874605 A    6/2014
CN    204884430 U    12/2015

(Continued)

OTHER PUBLICATIONS

International Search Report issued Jul. 6, 2021 in PCT/JP2021/015434 filed on Apr. 14, 2021, therein 3 pages.

*Primary Examiner* — Ricky D Shafer
(74) *Attorney, Agent, or Firm* — Oblon, McClelland, Maier & Neustadt, L.L.P.

(57) ABSTRACT

A fixture of the half mirror provides a half mirror spanning a display surface on a front side of a display panel and an air layer interposed therebetween. The fixture includes: a display mount joining the fixture itself to a center of a back surface of the display panel; a bridge that extends from the display mount toward an outer periphery of the display panel, further extends outward over the outer periphery of the display panel, and is joined to an outer periphery of the half mirror outside the outer periphery of the display panel; and an external mount joining the fixture itself to a hook that is an external structure.

14 Claims, 10 Drawing Sheets

(56) References Cited

U.S. PATENT DOCUMENTS

2018/0105110 A1\* 4/2018 Anzai ............... G02F 1/133638
2018/0321554 A1 11/2018 Niiyama

FOREIGN PATENT DOCUMENTS

KR 10-0513973 B1 9/2005
WO WO 2017/126624 A1 7/2017

\* cited by examiner

FIXTURE OF HALF MIRROR

INCORPORATION BY REFERENCE

This application is based upon and claims the benefit of priority from Japanese Patent Application 2020-079375 filed on Apr. 28, 2020, and PCT application No. PCT/JP2021/015434 filed on Apr. 14, 2021, the disclosure of which is incorporated herein in its entirety by reference.

BACKGROUND

The present invention relates to a device for fixing a half mirror to a display, and more particularly to a device for providing the half mirror spanning a display surface of a display panel.

International Patent Publication No. WO 2017/126624 discloses overlapping a mirror surface of a half mirror and a display surface of a display panel on the same region. This technique enables an excellently designed display form in which an image emerges in the mirror surface.

In International Patent Publication No. WO 2017/126624, display light of the display panel is circularly polarized light and enters the back surface of the half mirror. Here, the back surface means a surface located on the back side as viewed from an observer. The half mirror includes a transparent plate and an optical thin film provided on the back surface of the transparent plate. The optical thin film provides the transparent plate with a function of the half mirror. A cholesteric film is further provided on the optical thin film. Because the cholesteric film has liquid crystals inside forming a spiral structure, the cholesteric film selectively reflects the left and right rotation directions of the circularly polarized light. Additionally, this reflection has a broadband characteristic of selective reflection with little bias over the entire band of visible light. The cholesteric film and the display surface of the display panel have an air layer interposed therebetween.

A light-shielding member is disposed in a region other than the display region of the display panel via the air layer. This hides the outer periphery of the display panel or the frame when the observer observes the half mirror and the display panel on the back side.

On the other hand, in a case in which the display surface of the display panel is in close contact with the back surface of the half mirror with an adhesive interposed therebetween, the observer may be likely to see the outline of the display panel. In this case, one solution is to join the light-shielding member to the back surface of the half mirror without an air layer also in the region other than the display region of the display panel. Both the embodiment in which an air layer is provided and the embodiment in which joining is performed without an air layer are useful.

As described above, in a case in which there is an air layer between the back surface of the half mirror and the display surface of the display panel, these surfaces are not joined to each other. International Patent Publication No. WO 2017/126624 shows an example of a configuration having such an air layer. In such a configuration, the half mirror spans the display surface of the display panel. Since the half mirror is made of a rigid transparent plate, it can maintain its shape to some extent.

The set of the display panel and half-mirror is used in a state in which the half mirror is laid in front of the observer and stood facing the observer. Therefore, the display panel and the half mirror are fixedly joined with each other so that they do not come apart.

SUMMARY

An object of the present invention is to provide a tool that is advantageous for installing a half mirror on a display panel as needed and removing the half mirror from the display panel as needed.

[1] A fixture of a half mirror for providing the half mirror spanning a display surface on a front side of a display panel with an air layer interposed therebetween, the fixture comprising:
  a display mount joining the fixture itself to a center of a back surface of the display panel;
  a bridge extending from the display mount toward an outer periphery of the display panel, the bridge further extending outward over the outer periphery of the display panel, the bridge is joined to an outer periphery of the half mirror outside the outer periphery of the display panel; and
  an external mount joining the fixture itself to an external structure.

[2] The fixture according to [1], in which the display mount is detachable from the center of the back surface of the display panel, and additionally the external mount is detachable from the external structure.

[3] The fixture according to [2], in which
  the display mount and the external mount are compatible, and
  the display panel and the external structure can be directly joined to each other in a state in which the fixture is removed from the display panel and the external structure.

[4] The fixture according to [2] or [3], in which the display mount and the external mount each have screw holes arranged in a polygonal shape.

[5] The fixture according to any of [1] to [3], in which the bridge is joined to a plurality of points on the outer periphery of the half mirror, the points jointly supporting a center of gravity of the half mirror.

[6] The fixture according to [5], in which the bridge has a plurality of arms respectively directed toward the plurality of points.

[7] The fixture according to [5] or [6], in which the bridge covers an infrared sensor of the display panel, and includes a slit at a point where the bridge intersects a path of an infrared pulse toward the infrared sensor.

[8] The fixture according to any of [1] to [7], in which
  the half mirror covers and hides the front side of the display panel, and
  further outside the outer periphery of the display panel, the bridge is joined to the outer periphery of the half mirror.

[9] A use of the fixture according to any of [1] to [8] for:
  joining the fixture to an external structure by the external mount;
  joining the center of the back surface of the display panel to the fixture by the display mount;
  providing the half mirror spanning the display surface on the front side of the display panel and the air layer interposed therebetween; and
  joining the outer periphery of the half mirror to a point on the bridge, the bridge extending outward over the outer periphery of the display panel, the point being located outside the outer periphery of the display panel.

[10] The use according to [9] for, pressing an outer periphery of the display panel against a back surface of the half mirror further using a fastener together.

[11] A use of the fixture according to any of [1] to [8],
the fixture being joined to an external structure by the external mount,
the center of the back surface of the display panel being joined to the fixture by the display mount,
the half mirror spanning the display surface on the front side of the display panel with the air layer interposed therebetween,
the outer periphery of the half mirror being joined to a point on the bridge, the bridge extending outward over the outer periphery of the display panel, the point being located outside the outer periphery of the display panel,
the use for:
detaching the half mirror from the bridge to remove the half mirror from the display surface of the display panel;
detaching the display panel from the fixture to remove the display panel from the display mount; and
detaching the fixture from the external structure to remove the fixture from the external structure.

[12] The use according to [10] for, further directly joining the display panel to the external structure without the fixture interposed therebetween.

[13] A mirror surface display apparatus comprising the fixture according to any of [1] to [8], the mirror surface display apparatus further comprising a display panel, a half mirror, and an external structure of the fixture, in which
the fixture is joined to the structure by the external mount,
the center of the back surface of the display panel is joined to the fixture by the display mount,
the half mirror spans the display surface on the front side of the display panel with the air layer interposed therebetween, and
the outer periphery of the half mirror is joined to a point on the bridge, the bridge extending over the outer periphery of the display panel, the point being located outside the outer periphery of the display panel.

[14] The mirror surface display apparatus according to [13], in which the external structure is a stand.

[15] A use of the mirror surface display apparatus according to [13],
the external structure being a hook, the use for
hooking the hook on a stand to install the mirror surface display apparatus on the stand.

The present invention provides a tool that is advantageous for installing the half mirror on the display panel as needed and removing the half mirror from the display panel as needed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
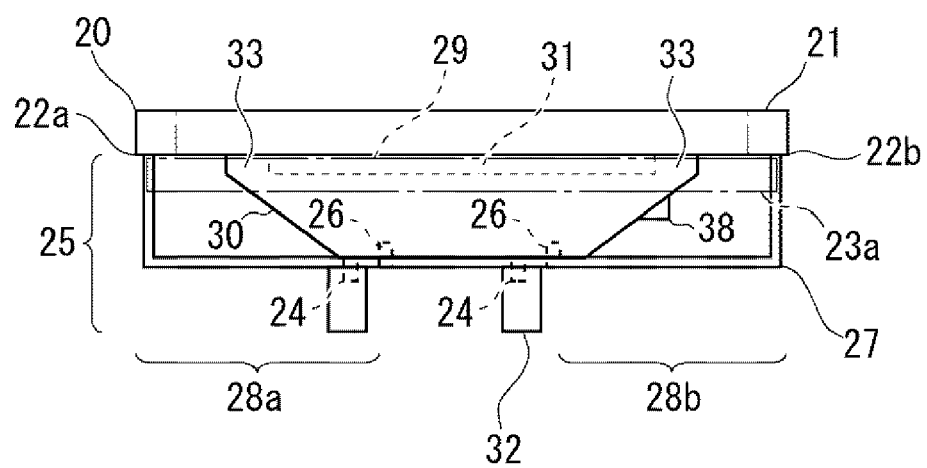
FIG. 1 is a plan view of a fixture.
Figure 2:
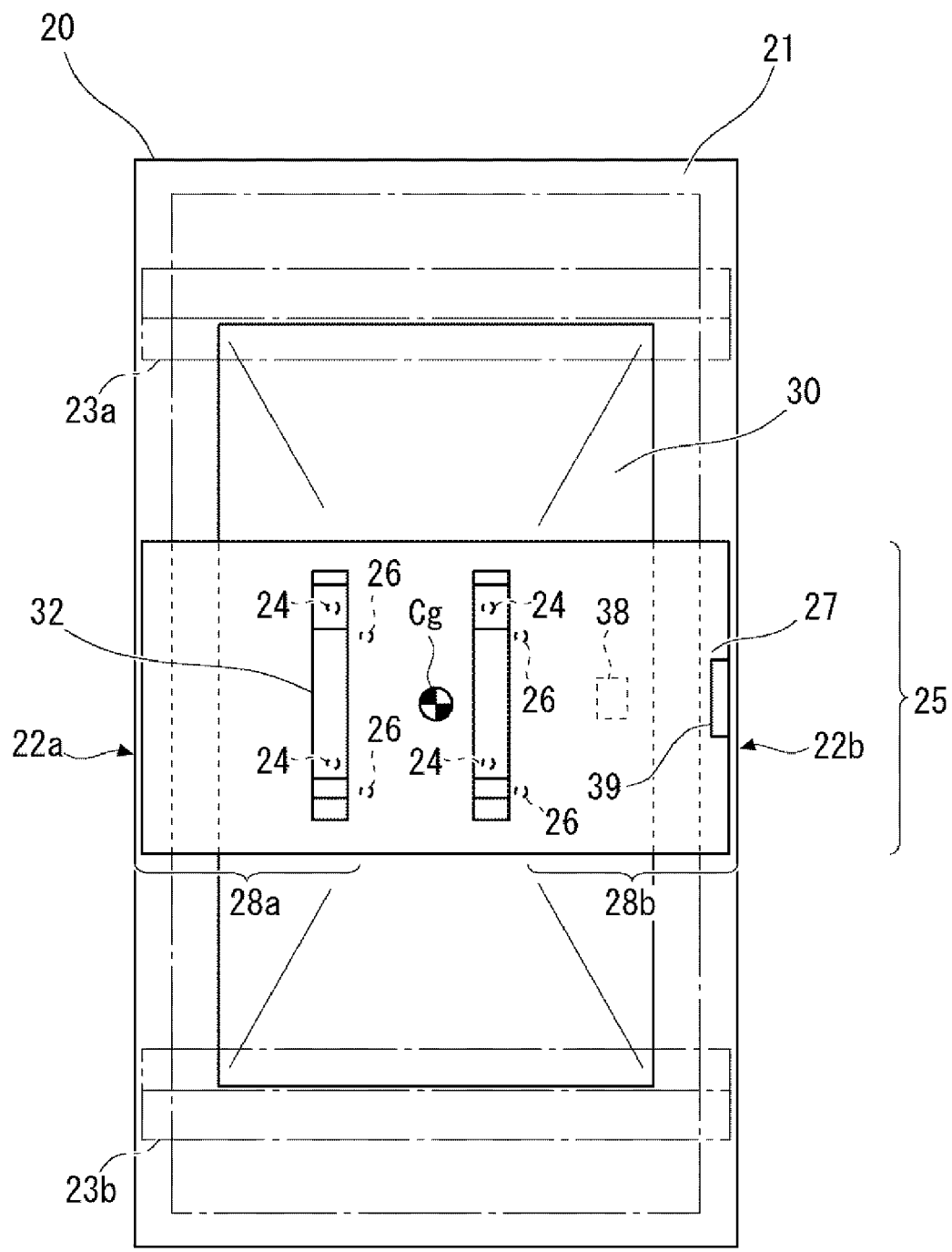
FIG. 2 is a rear view of the fixture.
Figure 3:
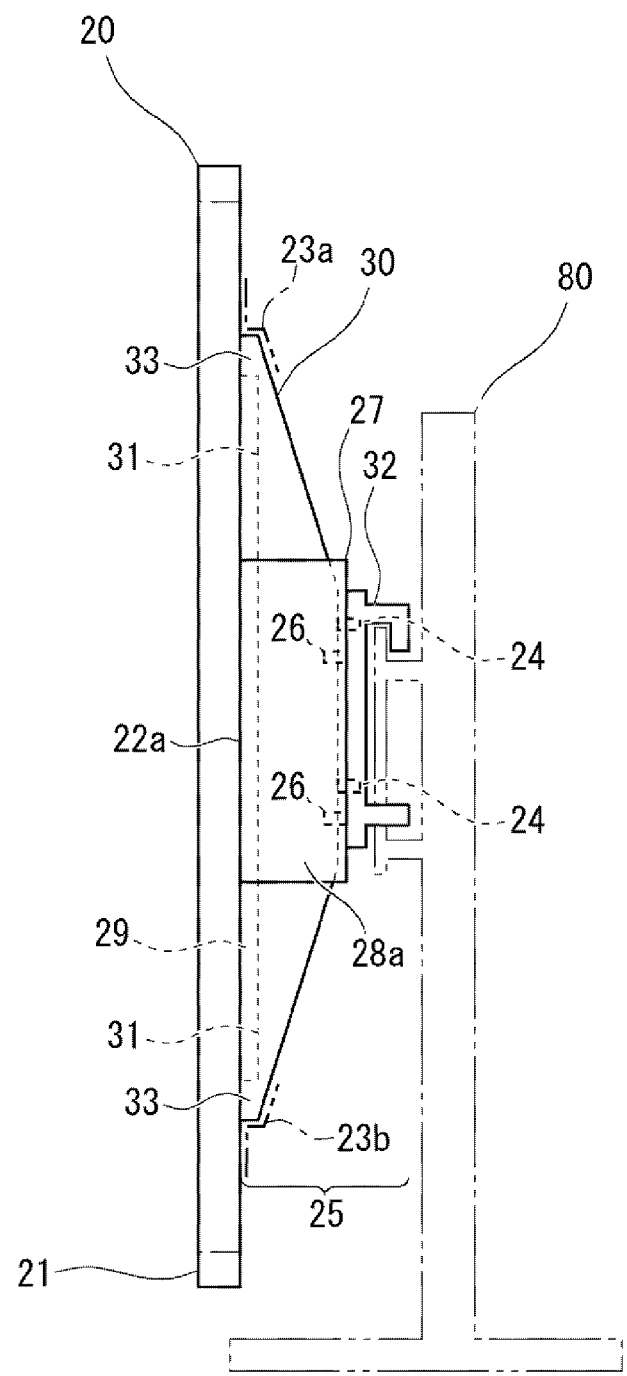
FIG. 3 is a side view of the fixture.

FIG. 1 is a plan view showing a fixture 25, and a half mirror 20, a display panel 30 and hooks 32 each joined to the fixture 25. FIG. 2 is a rear view. FIG. 3 is a left side view. The display panel 30 represents one configuration of display that is composed of a displaying panel such as a liquid crystal panel or an organic light-emitting diode panel with peripheral parts such as a bezel and a housing added thereto.

The fixture 25 fixes the half mirror 20 on the display panel 30 as shown in FIGS. 1 and 3. The display panel 30 has a display surface 31 on the front side thereof. The display surface 31 is spanned with the half mirror 20, and an air layer 29 is interposed therebetween. In one embodiment, having the air layer 29 interposed means that the display surface 31 and the back surface of the half mirror 20 overlap so as to face each other with a predetermined interval via an air layer interposed therebetween, without having any pressure sensitive adhesives, optical clear adhesives or other fillers interposed therebetween. In one embodiment, the longitudinal direction of the display panel 30 coincides with the longitudinal direction of the half mirror 20.

The display panel 30 has a bezel 33 arranged on the outer edge as shown in FIGS. 1 and 3. The bezel 33 surrounds the display surface in a front view of the display panel. In one embodiment, the bezel 33 is higher than the display surface 31 by about 1 to 10 mm. The interval between the display surface 31 and the back surface of the half mirror 20 is created by the height of the bezel 33. In one embodiment, the longitudinal direction of the display panel 30 is in the longitudinal direction of the half mirror 20.

The fixture 25 includes display mounts 26 and a bridge 27, as shown in FIGS. 1 to 3. The bridge 27 extends over the back surface of the display panel 30. In one embodiment, the bridge 27 extends over the housing cover on the back surface of the display panel 30. The bridge 27 includes arms 28a and 28b. These configure an integral bridge 27. In one embodiment, the longitudinal direction of the bridge 27 intersects the longitudinal direction of display panel 30. In another embodiment, the bridge 27 is composed of a combination of a plurality of arms. In another embodiment, the arm itself is composed of a combination of a plurality of parts.

As shown in FIGS. 1 and 2, the display mounts 26 joins the center of the back surface of the display panel 30 to the fixture 25 itself. In one embodiment, the display mounts 26 are composed of a plurality of screw holes. In one embodiment, the screw holes are arranged in a polygonal shape in a front view of the display mounts 26. In one embodiment, the display mounts 26 have a standard configuration also referred to as a VESA mount, FPMPMI (Flat Panel Monitor Physical Mounting Interface), and FDMI (Flat Display Mounting Interface). Hereinafter, the standard will be simply referred to as VESA mount. In one embodiment, display mounts 26 are detachable from the center of the back surface of display panel 30. In one embodiment, the display mounts 26 are detachable from the center of the housing cover of the back surface of the display panel 30. In one embodiment, the display panel 30 is also provided with a mount in the center of the back surface thereof. In one embodiment, they are joined to screws.

In one embodiment shown in FIGS. 1 and 2, the arm 28*a* extends from the display mounts 26 toward the bezel 33 located on the outer periphery of display panel 30. The arm 28*a* further extends outward over the bezel 33 of the display panel 30. The arm 28*a* is joined to the outer periphery 21 of the half mirror 20 outside the bezel 33. The arm 28*b* also extends from the display mounts 26 toward the bezel 33 and further extends outward over the bezel 33 of display panel 30. In one embodiment, the arm 28*b* extends in the direction opposite to the arm 28*a*. The arm 28*b* also is joined to the outer periphery 21 outside.

As shown in FIG. 1, the bridge 27 is joined to the outer periphery 21 at a plurality of points on the outer periphery 21, that is, joining portions 22*a* and 22*b*. As shown in FIG. 2, the joining portions 22*a* and 22*b* are located to face each other with the center of gravity Cg of the half mirror 20 interposed therebetween. The joining portions 22*a* and 22*b* are on the respective long sides of the half mirror 20. These joining portions can jointly support the center of gravity Cg. In another embodiment, the group of joining portions supporting the center of gravity Cg may be composed of three or more joining portions. In another embodiment, the bridge 27 may be a cover-like structure that covers a large area of the back surface of the half mirror 20 including the center of gravity Cg instead of a structure with arms.

As shown in FIG. 1, the arm 28*a* is joined to the outer periphery 21 on the extended surface of the overlapping surface of the display panel 30 and the half mirror 20. Such joining may be performed on the front side or may be performed on the back side with respect to the overlapping surface of the display panel 30 and the half mirror 20.

In one embodiment shown in FIGS. 1 to 3, the half mirror 20 covers the front side of the display panel 30. Further outside the bezel 33, the bridge 27 is joined to the outer periphery 21 of the half mirror.

The fixture 25 includes external mounts 24 as shown in FIGS. 1 to 3. The external mounts 24 joins the fixture 25 itself to the hooks 32 that is an external structure. The hooks 32 can be hooked on a stand 80. The stand 80 may be replaced by a building or a structure such as a wall or a fence.

In one embodiment shown in FIGS. 1 to 3, the external mounts 24 have screw holes arranged in a polygonal shape. In one embodiment, the screw holes arranged in a polygonal shape have a configuration conforming to VESA mount. In one embodiment, the hooks 32 have screw holes that are co-arranged with the external mounts 24. In one embodiment, they are joined to screws.

An external mount itself has hooks 32 in another embodiment shown in FIG. 3. In this embodiment, the external mounts 24 may be integral with the hooks 32. In this embodiment, the stand 80 may be regarded as an external structure.

In one embodiment shown in FIG. 3, the fixture 25 includes the external mounts 24 behind display mounts 26. The fixture 25 preferably has display mounts 26 on the front side, that is, the side over which the bridge 27 extends. Alternatively, the external mounts 24 can be at any points in the fixture 25. The external mounts 24 preferably do not obstruct joining between the center of the back surface of display panel 30 and display mounts 26. The external mounts 24 preferably do not obstruct overlapping of the half mirror 20 and the display panel 30.

In another embodiment shown in FIGS. 1 to 3, the fixture 25 is used in combination with fasteners 23*a* and 23*b*. These fasteners press the outer periphery of the display panel 30 against the back surface of the half mirror 20. In one embodiment, the fasteners 23*a* and 23*b* have a shape that follows the outer periphery of display panel 30. In one embodiment, these two fasteners are used in symmetrical positions across the fixture 25. In one embodiment, fasteners 23*a* and 23*b* are on the respective short sides of display panel 30. If the distance between the display mount 26 and the fastener 23*a* is shortened, the fastener 23*a* may not be installed. The same applies to the fastener 23*b*. If both distances are shortened, both fasteners 23*a* and 23*b* do not need to be installed.

Figure 4:
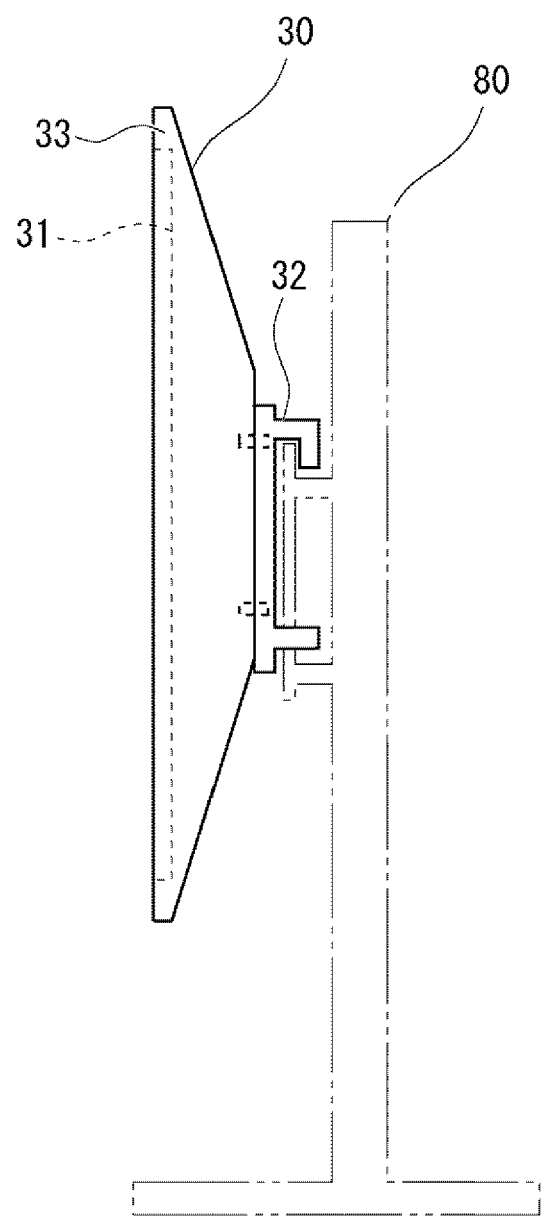
FIG. 4 is a side view of a display panel.

In another embodiment shown in FIGS. 1 to 3, there is compatibility between the display mounts 26 and the external mounts 24. FIG. 4 shows the display panel 30 and hooks 32 with the fixture 25 removed. In one embodiment as shown the figures, the display panel 30 can be directly joined to the hooks 32. This joining is made at the points where they have been joined respectively to display mounts 26 and external mounts 24. This joining may be made based on VESA mount.

In one embodiment shown in FIGS. 1 and 2, the display panel 30 includes a sensor 38. The bridge 27 covers the sensor 38 on the display panel. The sensor 38 is an infrared sensor that receives infrared pulses that have passed through a slit 39. The infrared pulses contain signals that control the display panel 30. The arm 28*b* in the bridge is provided with the slit 39. The slit 39 is located at a point where the path of the infrared pulses toward the sensor 38 intersects the arm 28*b*.

Another embodiment shown in FIGS. 1 to 3 is a mirror surface display apparatus including a fixture 25. This mirror surface display apparatus further includes a display panel 30, a half mirror 20, and an external structure of the fixture 25. In one embodiment, the external structure is the stand 80. The fixture 25 is joined to the stand 80 at the external mounts 24. The center of the back surface of the display panel 30 is joined to the fixture 25 with the display mounts 26. The display panel is provided with the half mirror 20 spanning the display surface 31, and an air layer 29 is interposed therebetween. The bridge 27 extends outward over the outer periphery of the display panel 30, and has points, outside the outer periphery of the display panel 30, to which the outer periphery 21 of the half mirror is joined.

Example 1

Figure 5:
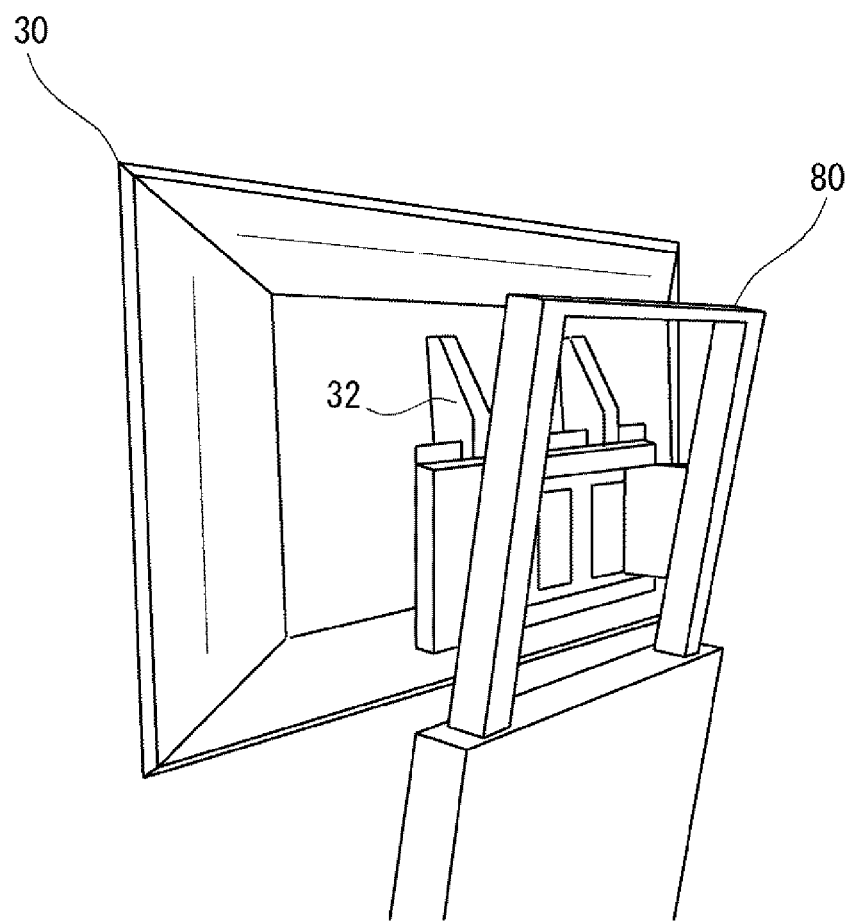
FIG. 5 is a perspective view of the display panel.

FIG. 5 is a perspective view of the display panel 30. In this example, the display panel 30 is installed long from side to side, "Landscape configuration". The display panel 30 is joined to the hooks 32. The hooks 32 are hung on the stand 80. To make the half mirror spanning the display panel 30, the hooks 32 are first removed from the stand 80. Next, the hooks 32 are removed from the display panel 30.

Figure 6:
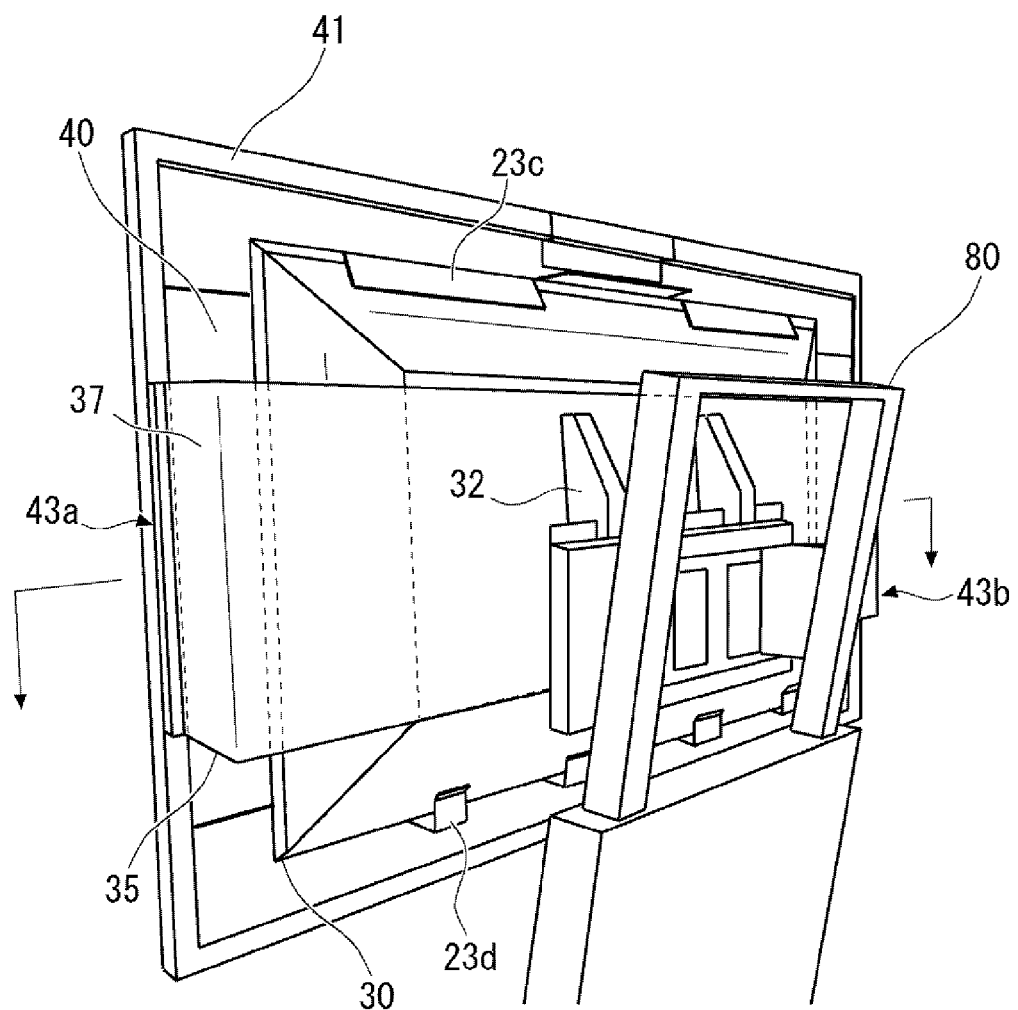
FIG. 6 is a perspective view of a fixture.

FIG. 6 is a perspective view of a fixture 35. The fixture 35 includes a bridge 37. In this respect, the fixture 35 differs from the fixture 25 shown in FIGS. 1 to 3. In other respects, the fixture 35 is in common with the fixture 25.

The longitudinal direction of the bridge 37 does not intersect the longitudinal direction of the display panel 30 and extends along it. In this respect, the bridge 37 differs from the bridge 27 shown in FIG. 2. The bridge 37 is in common with bridge 27 in other respects. In one embodiment, the longitudinal direction of bridge 37 coincides with the longitudinal direction of display panel 30.

Figure 7:
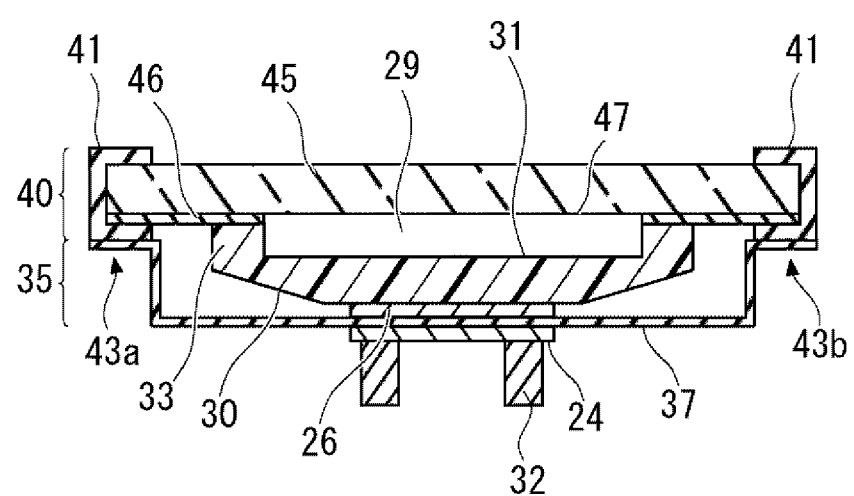
FIG. 7 is a view of an end surface in a cross section of the fixture in a plan view.

A cross section of the fixture 35 is taken at hook-shaped arrows shown in FIG. 6. FIG. 7 schematically shows an end surface of the cross section in a plan view. The method of using the fixture 35 will be described below with reference to these figures. The fixture 35 is joined to the hooks 32 with external mounts 24 as shown in FIG. 7. Next, the center of the back surface of the display panel 30 is joined to the fixture 35 with the display mount 26.

As shown in FIG. 7, the display surface 31 of the display panel is spanned with a half mirror 40, and an air layer 29 is interposed therebetween. As shown in FIGS. 6 and 7, both ends of the bridge 37 are joined to the half mirror 40 at points outside the outer periphery of the display panel 30. The half mirror 40 is the same as the half mirror 20 shown in FIGS. 1 to 3 except that a frame 41 is provided on its outer periphery. The bridge 37 is joined to the half mirror 40 at joining portions 43a and 43b on the frame 41. The joining portions 43a and 43b are on the respective short sides of the half mirror 40.

Thus, the half mirror 40 stacked on the display panel 30 is obtained as shown in FIG. 7. There, the display surface 31 and the back surface of the half mirror 40 are overlapped with an air layer interposed therebetween so as to face each other with a predetermined interval without any pressure sensitive adhesives, optical clear adhesives or other fillers interposed therebetween. The fixture 35 fixes the display panel 30 and the half mirror 40 to each other. Therefore, they can be hung on a stand 80 with hooks 32 as shown in FIG. 6.

Next, in FIGS. 6 and 7, the fixture is removed from the display panel and the hooks. First, the half mirror 40 is detached from the bridge 37. The half mirror 40 is now removed from the display surface 31 of the display panel. Further, the display mounts 26 are detached from the fixture 35. Also, the external mounts 24 are detached from the hooks 32. As described above, the fixture 35 is removed from the display panel 30 and the hooks 32. In one embodiment, the display panel 30 is directly joined to the hooks 32 without any fixture as shown in FIG. 5.

As shown in FIG. 6, the fixture 35 is used in combination with the fasteners 23c and 23d. These fasteners work similarly to fasteners 23a and 23b shown in FIGS. 1 to 3. The fasteners 23c and 23d are on the respective long sides of display panel 30. As described above, the outer periphery of the display panel 30 is pressed against the back surface of the half mirror 40.

As shown in FIG. 7, the half mirror 40 has a transparent plate 45 and a light-shielding plate 46 in contact with its outer periphery. The light-shielding plate 46 may be, for example, an aluminum plate laminated with a light-shielding sheet (film) or an aluminum alloy coated with black. The light-shielding surface of the light-shielding plate 46 is set to face the transparent plate 45. The frame 41 sandwiches the transparent plate 45 and the light-shielding plate 46 together. A back surface 47 of the transparent plate 45 faces the display surface 31 of the display panel at the center and faces the light-shielding plate 46 at the outer periphery. In one embodiment, the light-shielding plate 46 surrounds four sides of the bezel 33. As a result, the light-shielding plate 46 blocks the light around the display panel 30, so that the observer hardly notices the figure of the display panel 30 even in a front view of the half mirror 40.

Figure 8:
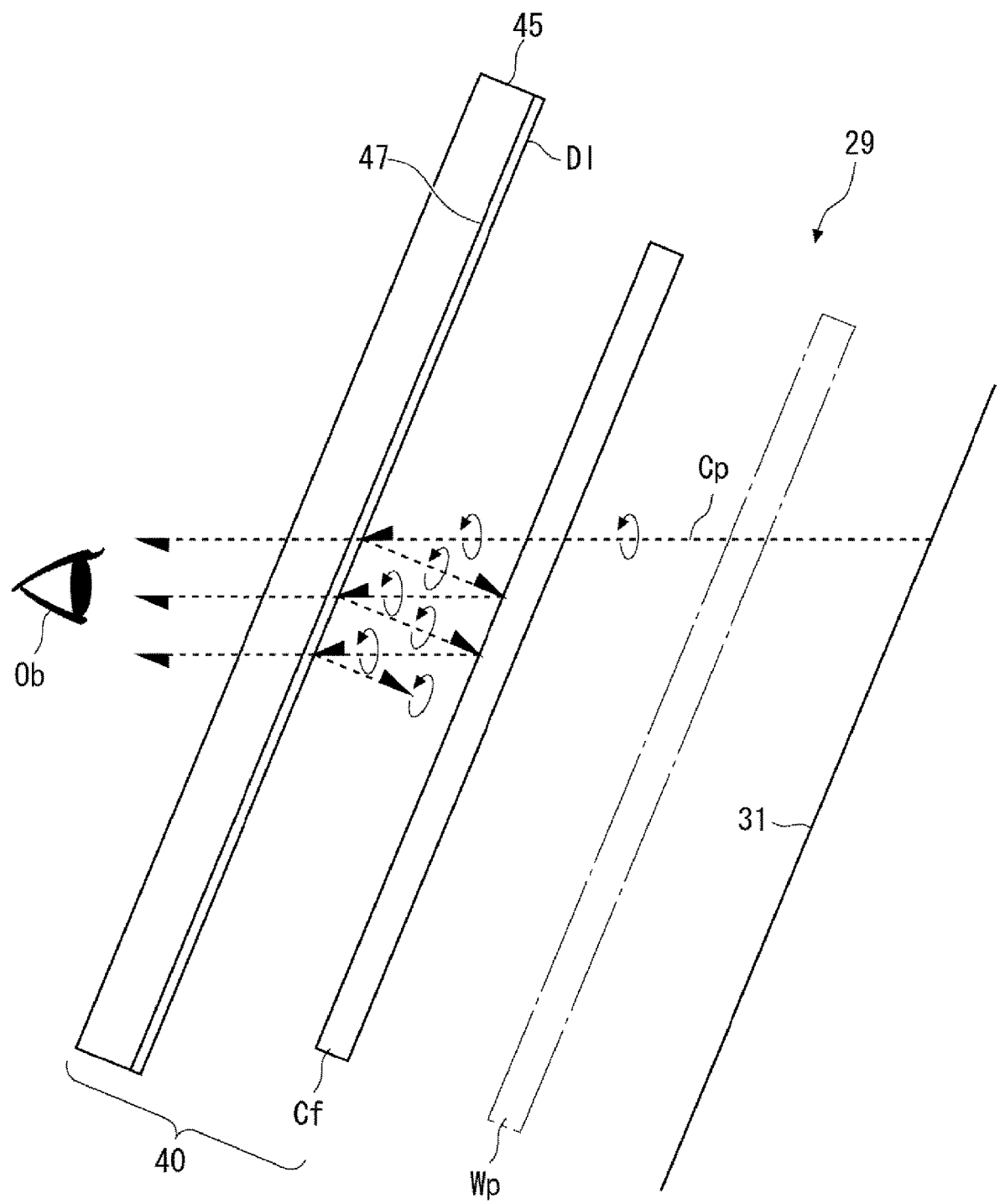
FIG. 8 is an optical configuration diagram of a half mirror 40.

FIG. 8 shows an example of the optical configuration of the half mirror 40. To make the optical path easier to see, the half mirror 40 and other optical elements are over-inclined. As shown in the figure, the display light emitted from the display surface 31 of the display panel is circularly polarized light Cp. An example of the displaying panel that emits such display light is an organic light-emitting diode panel.

In one embodiment shown in FIG. 8, the circularly polarized light Cp is left-handed circularly polarized light and has a right-hand spiral with respect to the traveling direction. If the display light is linearly polarized light, it may be converted into circularly polarized light with a wavelength plate Wp. An example of the displaying panel that emits such display light is a liquid crystal panel. In one embodiment, the wavelength plate Wp is a quarter-wavelength plate.

As shown in FIG. 8, the circularly polarized light Cp enters on the back side of the half mirror 40 through the air layer 29. The back surface is the surface located on the back side as viewed from the observer Ob. The half mirror 40 includes a dielectric multilayer film D1 provided on the back surface 47 of the transparent plate 45. The dielectric multilayer film D1 provides the transparent plate 45 with a function of a half mirror. The dielectric multilayer film D1 may be replaced with another optical thin film that provides the transparent plate 45 with a function of a half mirror.

As shown in FIG. 8, the dielectric multilayer film D1 further has a cholesteric film Cf provided thereover. Since the cholesteric film Cf has liquid crystals inside forming a spiral structure, the reflection caused by the cholesteric film Cf has selectivity for the left and right rotation directions of the circularly polarized light. The cholesteric film Cf in the figure passes left-handed circularly polarized light therethrough and reflects right-handed circularly polarized light. This reflection has a broadband characteristic of selective reflection with little deviation over the entire band of visible light. The cholesteric film Cf may be replaced by other optical elements having selectivity for the left and right rotation directions of circularly polarized light. The wavelength plate Wp may be installed on the display surface 31 side of the display panel or may be installed on the cholesteric film Cf side. In a case in which the wavelength plate Wp is joined to the cholesteric film Cf side, the linearly polarized light from the display surface 31 of the display panel enters the back side of the half mirror 40 via the air layer 29. The circularly polarized light or elliptically polarized light from the display surface 31 of the display panel can be converted by the wavelength plate Wp into circularly polarized light that the cholesteric film Cf can selectively reflect or selectively pass therethrough.

As shown in FIG. 8, while the circularly polarized light Cp is repeatedly reflected between the dielectric multilayer film D1 and the cholesteric film Cf, a portion of the circularly polarized light Cp passes through the dielectric multilayer film D1 and is preferentially emitted to the front side of the half mirror 40. This can enhance the transmittance of the display light passing through the half mirror 40 while enhancing the specular reflectance of the half mirror 40. The design of such a cholesteric film Cf is disclosed in International Patent Publication No. WO 2017/126624.

Example 2

Figure 9:
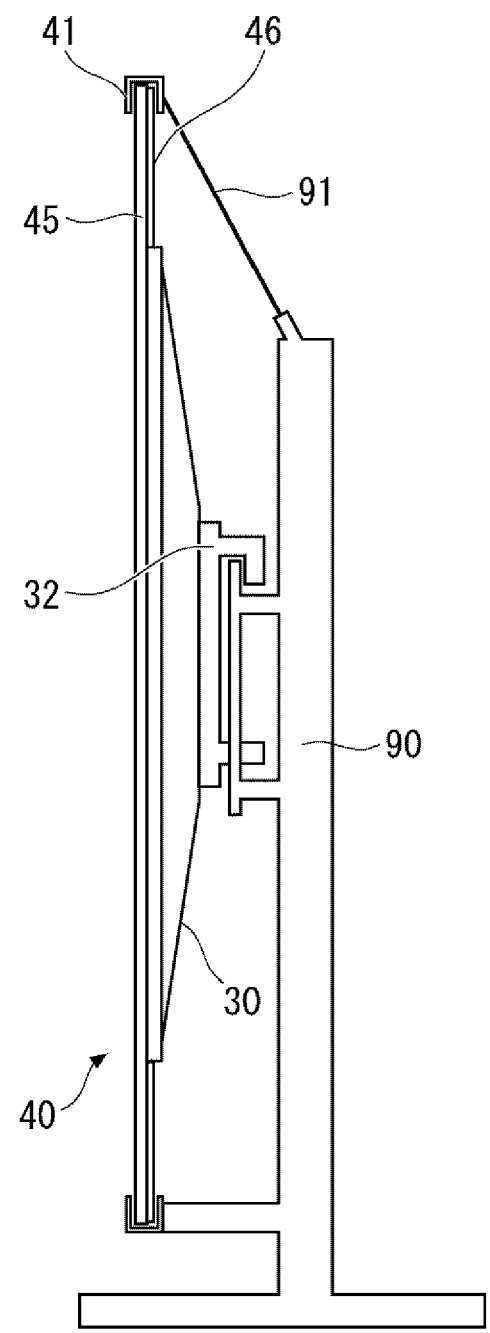
FIG. 9 is a side view of Example 2.

FIG. 9 shows the display panel 30 and the half mirror 40 in a side view. Only the frame 41 is shown in cross section. In this example, the half mirror 40 spanning the display panel 30 is provided by using a stand 90 and a rope 91 without using a fixture. The stand 90 supports the lower portion of the frame 41. The rope 91 holds the upper portion of the frame 41.

In the example shown in FIG. 9, the stand 90 needs to be designed according to the external dimensions of the half mirror 40. It is difficult to install the half mirror 40 on the stand that is not designed that way. On the other hand, in the configuration shown in <Example 1> above, the hooks 32 designed according to a stand are installed on the fixture 35 via the external mounts 24. Using such an installation style allows the half mirror 40 to be installed on and removed from various stands.

In the example shown in FIG. 9, it is necessary to pull the rope 91 to enhance the close contact between the display panel 30 and the half mirror 40. In a case in which the stand 90 has a higher rigidity than the half mirror 40, the stress concentrates on the half mirror 40 when the rope 91 is strongly pulled.

Therefore, the half mirror 40 bends. This makes it difficult to bring the display panel 30 and the half mirror 40 into close contact with each other. On the other hand, in the configuration shown in <Example 1> above, the rigidity of the bridge is used to bring the display panel 30 and the half mirror 40 into close contact with each other. At this time, the influence of the rigidity of the stand 80 on the half mirror 40 and the display panel 30 is relatively small.

Example 3

Figure 10:
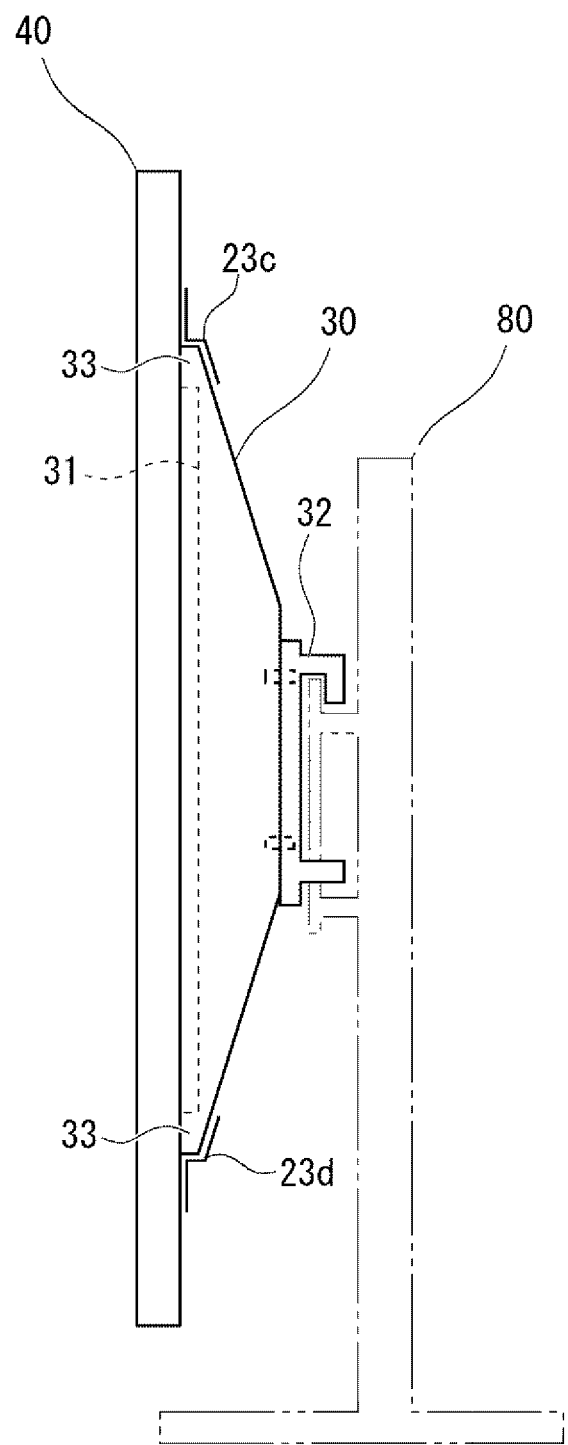
FIG. 10 is a side view of Example 3.

FIG. 10 shows the display panel 30 and the half mirror 40 in a side view. In this example, the half mirror 40 spanning display panel 30 is provided with by using the fasteners 23c and 23d without using a fixture.

In the example shown in FIG. 10, the weight of the half mirror 40 is entirely applied to the outer edge of the display panel 30 housing. In the figure, a bezel 33 is arranged on the outer edge. In a case in which the half mirror 40 is large-sized, the weight of the main body having the half mirror surface is large, and the weight of the peripheral frame is also large. When such a half mirror 40 is coupled to the outer edge of the housing of the display panel 30, the housing may deform due to the load of the weight. Along with the deformation, the displaying panel built in the display panel 30 is also subjected to stress and deforms. Such deformation, even if it is small, may impair the display quality of the display panel 30. Therefore, prevention of deformation of the housing of the display panel 30 must be taken into consideration.

On the other hand, in the configuration shown in <Example 1> above, the half mirror 40 is supported by a fixture 35 including a bridge 37 as shown in FIGS. 6 to 7. In this case, the load of the weight of the half mirror 40 on the housing of the display panel is greatly reduced.

Also, when the half mirror is removed as shown in FIG. 4, the bezel 33 positioned on the outer edge of the housing of the display panel 30 is viewed from the front. In a mirror surface display apparatus having a half mirror, consideration is given to making the bezel 33 located at the outer edge of the display panel thinner to increase the display region in the mirror image plane of the half mirror as much as possible. However, the thin bezel 33 reduces the distance from the place where the stress is applied near the bezel 33 to the displaying panel built in the display panel 30. Therefore, the displaying panel built in the display panel 30 is likely to deform. Further, this deformation impairs the display quality of the display panel 30. A use of a fixture including a bridge prevents the display housing from deforming near the bezel 33. Therefore, the use of the fixture is effective in overlapping the half mirror with the display surface 31 of the display 30 with a large display region provided.

Note that the present inventions are not limited to the above embodiments, and can be modified as appropriate without departing from the scope of the invention.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

REFERENCE SIGNS LIST

20 HALF MIRROR, 21 OUTER PERIPHERY, 22a-22b JOINING PORTION, 23a-23d FASTENER, 24 EXTERNAL MOUNT, 25 FIXTURE, 26 DISPLAY MOUNT, 27 BRIDGE, 28a-28b ARM, 29 AIR LAYER, 30 DISPLAY PANEL, 31 DISPLAY SURFACE, 32 HOOK, 33 BEZEL, 35 FIXTURE, 37 BRIDGE, 38 SENSOR, 39 SLIT, 40 HALF MIRROR, 41 FRAME, 43a-43b JOINING PORTION, 45 TRANSPARENT PLATE, 46 LIGHT-SHIELDING PLATE, 47 BACK SURFACE, 80 STAND, 90 STAND, 91 ROPE, Cf CHOLESTERIC FILM, Cg CENTER OF GRAVITY, Cp CIRCULARLY POLARIZED LIGHT, D1 DIELECTRIC MULTILAYER FILM, Ob OBSERVER, Wp WAVELENGTH PLATE

The invention claimed is:

1. A fixture of a half mirror for providing the half mirror spanning a display surface on a front side of a display panel with an air layer interposed therebetween, the fixture comprising:
   a display mount joining the fixture itself to a center of a back surface of the display panel and;
   a bridge extending from the display mount toward an outer periphery of the display panel, the bridge further extending outward over the outer periphery of the display panel, the bridge joining an outer periphery of the half mirror outside the outer periphery of the display panel; and
   an external mount joining the fixture itself to an external structure.

2. The fixture according to claim 1, wherein the display mount is detachable from the center of the back surface of the display panel, and additionally the external mount is detachable from the external structure.

3. The fixture according to claim 2, wherein
   the display mount and the external mount are compatible, and
   the display panel and the external structure can be directly joined to each other in a state in which the fixture is removed from the display panel and the external structure.

4. The fixture according to claim 2, wherein the display mount and the external mount each have screw holes arranged in a polygonal shape.

5. The fixture according to claim 1, wherein the bridge is joined to a plurality of points on the outer periphery of the half mirror, the points jointly supporting a center of gravity of the half mirror.

6. The fixture according to claim 5, wherein the bridge has a plurality of arms respectively directed toward the plurality of points.

7. The fixture according to claim 5, wherein the bridge covers an infrared sensor of the display panel, and includes a slit at a point where the bridge intersects a path of an infrared pulse toward the infrared sensor.

8. The fixture according to claim 1, wherein
   the half mirror covers and hides the front side of the display panel, and
   further outside the outer periphery of the display panel, the bridge is joined to the outer periphery of the half mirror.

9. A use of the fixture according to claim 1 for:
joining the fixture to the external structure by the external mount;
joining the center of the back surface of the display panel to the fixture by the display mount;
providing the half mirror spanning the display surface on the front side of the display panel and the air layer interposed therebetween; and
joining the outer periphery of the half mirror to a point on the bridge, the bridge extending outward over the outer periphery of the display panel, the point being located outside the outer periphery of the display panel.

10. The use according to claim 9 for, pressing an outer periphery of the display panel against a back surface of the half mirror further using a fastener together.

11. A use of the fixture according to claim 1,
the fixture being joined to the external structure with the external mount,
the center of the back surface of the display panel being joined to the fixture with the display mount,
the half mirror spanning the display surface on the front side of the display panel with the air layer interposed therebetween,
the outer periphery of the half mirror being joined to a point on the bridge, the bridge extending outward over the outer periphery of the display panel, the point being located outside the outer periphery of the display panel,
the use for:
detaching the half mirror from the bridge to remove the half mirror from the display surface of the display panel;
detaching the display panel from the fixture to remove the display panel from the display mount; and
detaching the fixture from the external structure to remove the fixture from the external structure.

12. A mirror surface display apparatus comprising:
the fixture according to claim 1, the display panel, the half mirror, and the external structure of the fixture, wherein
the fixture is joined to the structure by the external mount,
the center of the back surface of the display panel is joined to the fixture by the display mount,
the half mirror spans the display surface on the front side of the display panel with the air layer interposed therebetween, and
the outer periphery of the half mirror is joined to a point on the bridge, the bridge extending over the outer periphery of the display panel, the point being located outside the outer periphery of the display panel.

13. The mirror surface display apparatus according to claim 12, wherein the external structure is a stand.

14. A use of the mirror surface display apparatus according to claim 12,
the external structure being a hook, the use for
hooking the hook on a further external stand to install the mirror surface display apparatus on the stand.

* * * * *